United States Patent
Fish et al.

(10) Patent No.: US 8,303,243 B2
(45) Date of Patent: Nov. 6, 2012

(54) TURBINE WASH PORT FOR A GAS TURBINE ENGINE

(75) Inventors: Jason Fish, Brampton (CA); Kian McCaldon, Orangeville (CA)

(73) Assignee: Pratt & Whitney Canada Corp., Longueuil (CA)

(*) Notice: Subject to any disclaimer, the term of this patent is extended or adjusted under 35 U.S.C. 154(b) by 967 days.

(21) Appl. No.: 12/354,207

(22) Filed: Jan. 15, 2009

(65) Prior Publication Data
US 2010/0178158 A1    Jul. 15, 2010

(51) Int. Cl.
*F02C 7/00* (2006.01)
*F01D 25/00* (2006.01)

(52) U.S. Cl. .............. 415/116; 60/772; 60/766; 60/796; 60/797; 60/798; 244/53 R; 244/54

(58) Field of Classification Search ............ 60/772, 60/796, 797, 798, 801, 39.55, 752, 775; 415/116; 244/53 R, 54; 134/18, 26, 34, 113
See application file for complete search history.

(56) References Cited

U.S. PATENT DOCUMENTS

| | | | |
|---|---|---|---|
| 2,549,819 A | 4/1951 | Kane | |
| 3,623,668 A | 11/1971 | Freid et al. | |
| 4,046,155 A | 9/1977 | Mansson | |
| 5,020,329 A * | 6/1991 | Ekstedt et al. | 60/737 |
| 5,385,014 A | 1/1995 | Rathbun | |
| 5,771,696 A * | 6/1998 | Hansel et al. | 60/739 |
| 5,938,402 A | 8/1999 | Bochud et al. | |
| 5,944,483 A | 8/1999 | Beck et al. | |
| 6,233,937 B1 | 5/2001 | Gray | |
| 7,065,955 B2 | 6/2006 | Reback et al. | |
| 7,373,781 B2 | 5/2008 | Reback et al. | |
| 7,531,048 B2 * | 5/2009 | Woodcock et al. | 134/34 |
| 2010/0281881 A1 * | 11/2010 | Morenko | 60/796 |

* cited by examiner

*Primary Examiner* — Ehud Gartenberg
*Assistant Examiner* — Salvatore C Pais
(74) *Attorney, Agent, or Firm* — Norton Rose Canada LLP

(57) ABSTRACT

An access conduit for access to the interior of a combustor for the washing of the turbine components of a gas turbine engine. The access conduit is secured between a gas generator case and a combustion chamber liner of the combustor. The access conduit has an open outer end accessible from an outer face of the gas generator case and an open inner end exiting in a combustion chamber through the liner. The access conduit has one or more openings disposed in a combustor gap between the gas generator case and the liner of the combustor. A plug is removably secured in the open outer end and extends into the access conduit to obstruct the one or more openings.

14 Claims, 3 Drawing Sheets

US 8,303,243 B2

TURBINE WASH PORT FOR A GAS TURBINE ENGINE

TECHNICAL FIELD

The present disclosure relates to an access conduit for the passage of a wash tube to wash internal components of a gas turbine engine.

BACKGROUND ART

Gas turbine engines often require the washing of the turbine components by introducing washing fluid through the gas generator case. Typically this is accomplished through a specialized port or an ignitor port which gives access through the case and into the combustion liner. A wash tube is then inserted in the specialized port to inject washing fluid under pressure into the gas generator case. If the specialized port is accidentally left open after a washing operation this could result in a flame torching into the nacelle from the gas generator.

SUMMARY

According to a general aspect, there is provided an access conduit for the access to the interior of a combustor for the washing of turbine components of a gas turbine engine, the access conduit being secured between a gas generator case and a combustion chamber liner of the combustor, the access conduit having an open outer end accessible from an outer face of said gas generator case and an open inner end exiting in a combustion chamber through the combustion chamber liner, the access conduit having one or more openings disposed in a gap between the gas generator case and the combustion chamber liner of the combustor, and removable obstruction apparatus securable in the open outer end and extending into the access conduit to obstruct said one or more openings.

In accordance with another general aspect, there is provided a method of providing access to the interior of a combustor for the washing of turbine components of a gas turbine, the method comprising: providing an access conduit between a gas generator case and a combustion chamber liner of a combustor with an open outer end of said access conduit being accessible exteriorly of said gas generator case and an open inner end exiting in a combustion chamber of said combustor through said liner, said access conduit having one or more openings disposed in a combustor gap between said gas generator case and said liner; securing a removable obstruction means in said open top end of said access conduit and extending into said access conduit to obstruct said one or more openings; and providing access through said access conduit inside said combustion chamber by the removal of said obstruction means to provide for the insertion of a wash delivery conduit element in said access conduit and inside said combustion chamber to wash said turbine components.

BRIEF DESCRIPTION OF DRAWINGS

Reference is now made to the accompanying figures, in which.

DETAILED DESCRIPTION

Figure 1:
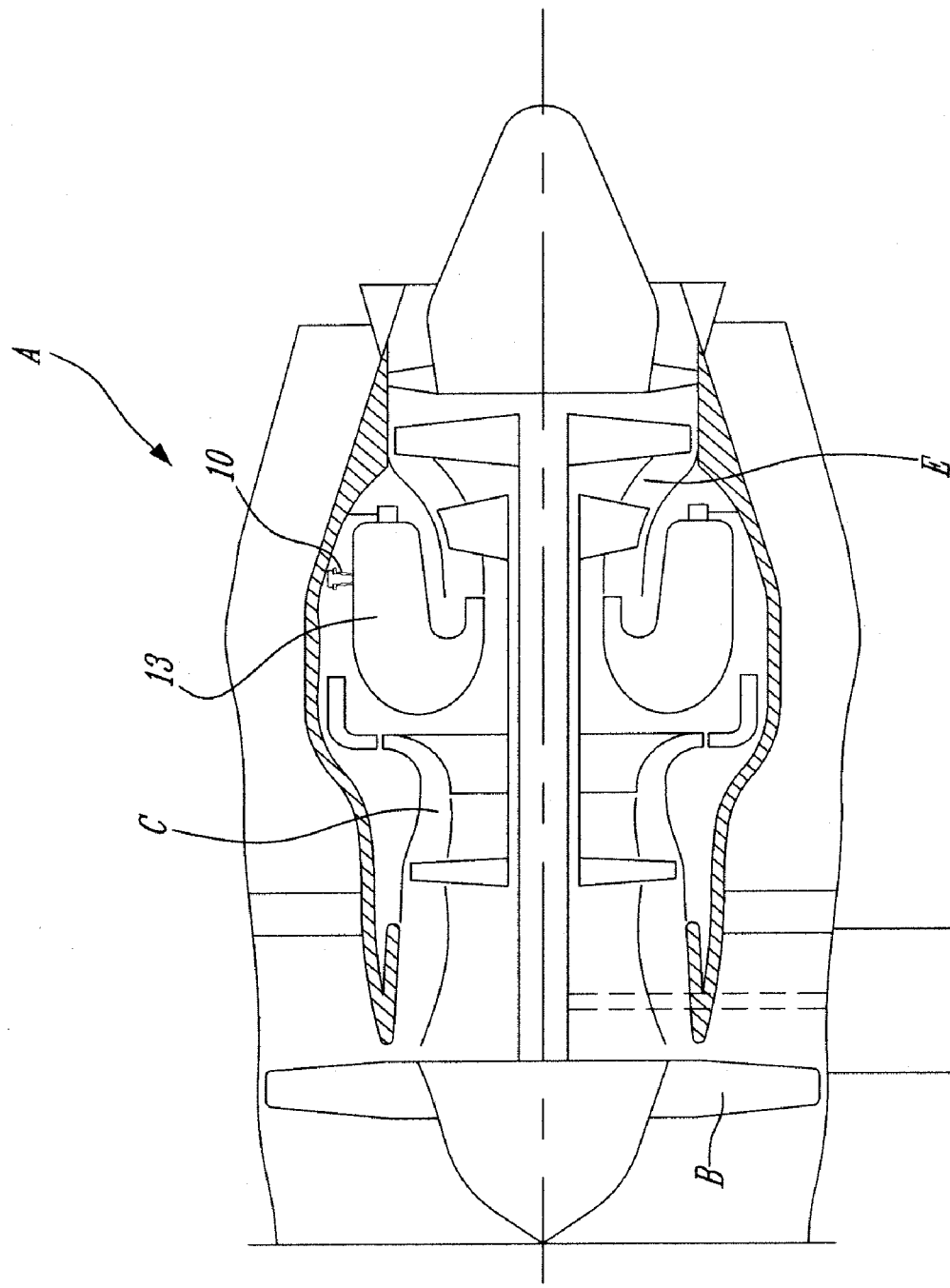
FIG. 1 is schematic cross-sectional view of a gas turbine engine.

FIG. 1 illustrates a turbofan gas turbine engine A of a type preferably provided for use in subsonic flight, generally comprising in serial flow communication a fan B through which ambient air is propelled, a multistage compressor C for pressurizing the air, a combustor 13 in which the compressed air is mixed with fuel and ignited for generating an annular stream of hot combustion gases, and a turbine section E for extracting energy from the combustion gases.

Figure 2:
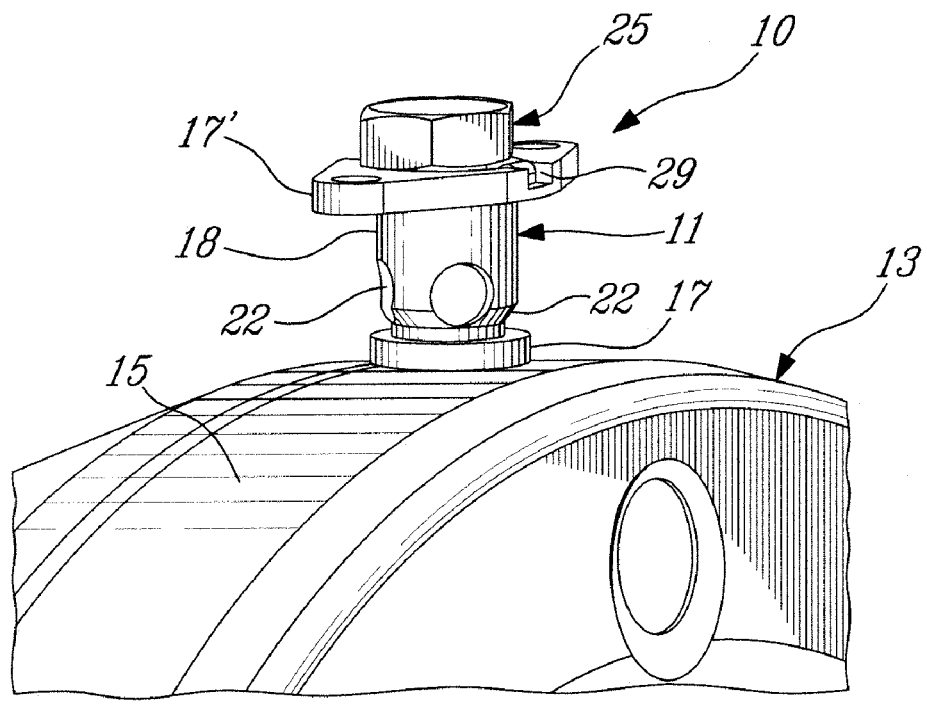
FIG. 2 is a perspective view showing an access conduit, herein a combustor support pin, secured to the combustion chamber liner of a combustor of the gas turbine engine and wherein the access conduit is provided with a plug removably engaged within the combustor support pin.
Figure 3:
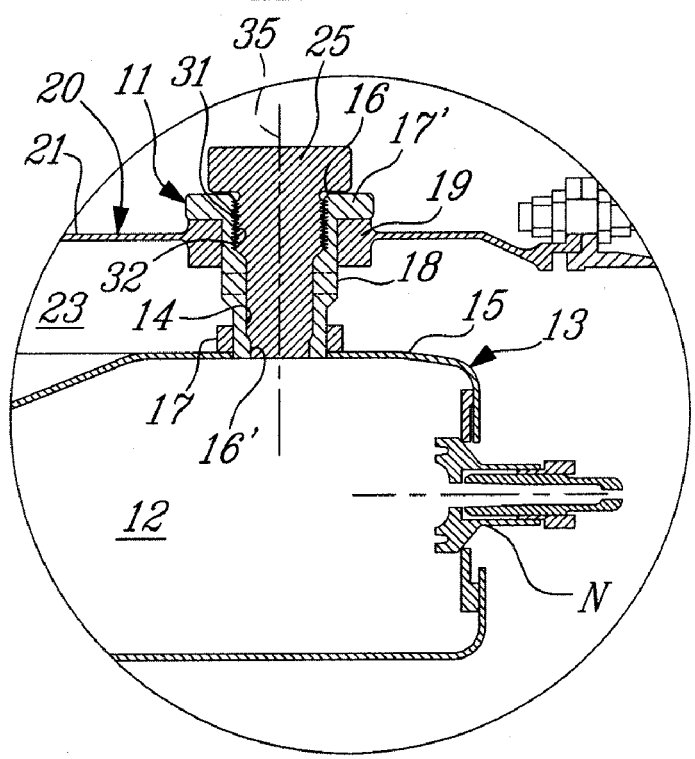
FIG. 3 is a section view, partly fragmented, showing the hollow combustor support pin with the plug secured therein and spanning the combustor gap between the gas generator case and the combustion chamber liner with the open top end of the pin being accessible from an outer face of the gas generator case and the bottom end exiting in the combustion chamber of the combustor.
Figure 4:
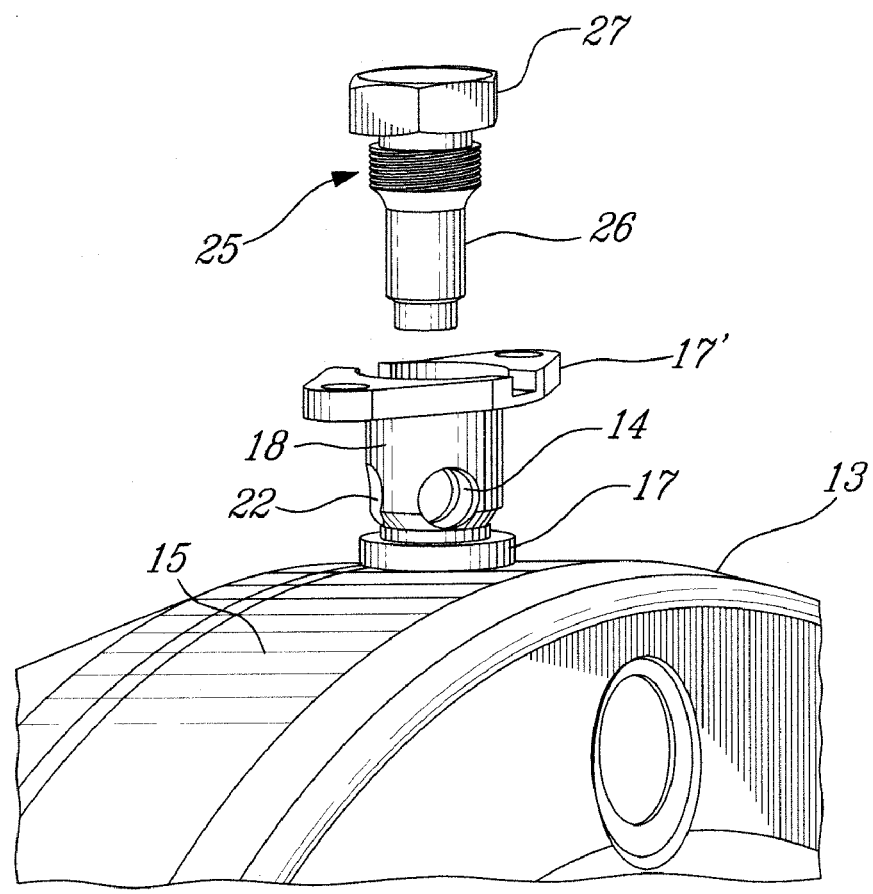
FIG. 4 is a view similar to FIG. 2 but showing the plug disengaged from the hollow combustor support pin and wherein the openings formed in the side wall of the hollow pin are in communication with the combustor gap.

With reference to FIGS. 2 to 4, there is shown generally at 10 an access conduit, herein provided by a hollow combustor support pin 11 to provide access to the combustion chamber 12, see FIG. 3, of the combustor 13. The support pin 11 extends radially outwardly from the combustor 13 and is disposed at the bulkhead or dome portion of the combustor 13 downstream of the fuel nozzles N (see FIG. 3). A plurality of such support pins can be circumferentially distributed about the combustor 13 to provide support thereto. The combustor support pin 11 has a through bore 14 defining an open top end 16 and an open bottom end 16'. The bottom end 16' of the hollow combustor support pin 11 is secured to the combustion chamber liner 15 by a suitable fastening means 17. A securement flange 17' is secured about the upper end of the side wall 18 of the combustor support pin 11 for immovable securement to a reinforced collar 19 of the gas generator case 20. Accordingly, the open top end 15 of the support pin 11 is accessible from a radially outer face 21 of the gas generator case 20.

As better seen from FIGS. 2 and 4, one or more openings 22 of predetermined size are formed in the side wall 18 of the support pin 11 and communicates with the through bore 14 of the support pin 11. These openings 22 are disposed such as to be in communication with the gap 23 spanning the gas generator case 20 and the combustion liner 15. As herein shown, a removable obstruction means in the form of a plug 25 or the like is removably secured in the through bore 14 from the open top end 16 of the through bore and has a stem section 26 (FIG. 4) which extends into the through bore to obstruct the one or more openings 22. Typically in the embodiment herein shown there are four of these openings 22 uniformly distributed along the circumference of wall 18.

Figure 5:
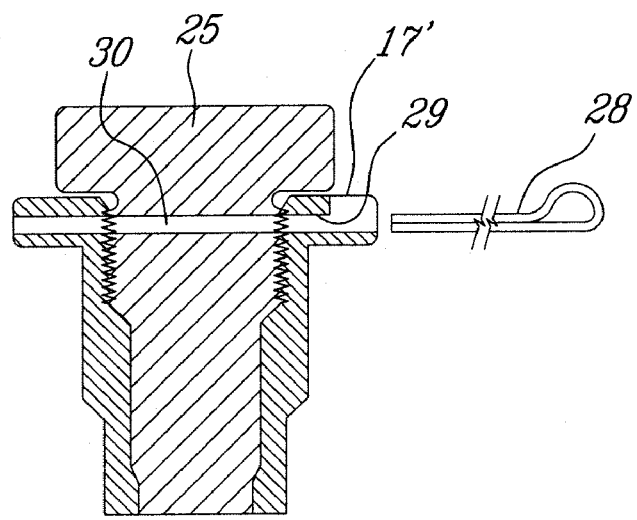
FIG. 5 is a simplified section view showing an alternate plug engagement means for securing the plug in the hollow combustor support pin.

As shown in FIG. 4, the plug 25 has a head 27 at a top end. The straight stem section 26 has a cross-section adapted for close sliding fit into the through bore 14 whereby to substantially seal the one or more openings 22. The plug 25 is also provided with engagement means, one of which is illustrated in FIG. 5 as being constituted by a lock pin 28 adapted to be disposed in a through bore or a slot 29 extending across the upper securement flange 17' and through a straight hole 30 formed in the plug 25. Although the plug 25 is shown as having a square straight stem section 26, it is not intended to be limited thereto and such straight stem section 26 and through bore 14 could also be of circular cross-section and in which case the engagement means of the plug may be constituted by an outer thread section 31 provided in the upper part of the straight stem section 26 and an inner thread section 32 provided in the upper section of the through bore 14, such being illustrated in FIG. 3 as an alternative engagement means.

The hollow combustor support pin 11 and the plug 25 are formed of metal such as high-strength aluminum. There are usually three of these support pins to support the combustor 13. Two of these pins are used for the purpose of housing ignitors and now the third pin is used as the access conduit 10. These support pins are disposed about the combustor and substantially aligned with the ignitor plane 35.

With reference again to FIG. 3, and as above described, the openings 22 are in communication with the compressor air gap 23 and this is being provided to make the access conduit 10 mistake-proof in the event that after a wash operation the operator person forgets to engage the plug within the hollow combustor support pin 11. In such a situation during engine operation there will be sufficient air entering the large openings 22 and into the combustion chamber 12 to prevent any torching flame from exiting the combustion chamber 12 and into the gap 23 thereby causing a dangerous situation. The large openings 22 are of predetermined size whereby sufficient air will flow into the combustion chamber 12 whereby to prevent combustion air from flowing out of the combustion chamber 12. This will protect the nacelle and aircraft from severe damage.

The provision of the access conduit 10, as herein described, also results in a novel method of providing access to a combustion chamber of the combustor of a gas turbine engine for washing the turbine components. The method comprises the steps of providing an access conduit, herein one of the hollow combustor support pins 11, between the gas generator case 20 and the combustion chamber liner 15 for the passage of a wash tube to the combustion chamber 12 via the through bore 14 of the hollow combustor support pin 11. The wash tube may also be used to wash the combustion chamber 12 as well as other turbine components, not shown herein but obvious to a person skilled in the art.

The method further comprises securing the removable obstruction means, herein the plug 25, in the open top end 15 with the stem 26 of the plug extending into the access conduit or through bore 14 to obstruct the large openings 22 formed in the side wall of the support pin.

As mentioned above, typically there would be provided three of these hollow combustor support pins 11 in a gas turbine engine and two of these are used for the additional purpose of housing ignitors.

The above description is meant to be exemplary only, and one skilled in the art will recognize that changes may be made to the embodiment described herein without departing from the scope of the invention disclosed. It is therefore within the ambit of the present invention to cover any obvious modifications provided these modifications fall within the scope of the appended claims.

What is claimed is:

1. An access conduit for access to the interior of a combustor for washing of turbine components of a gas turbine engine, the access conduit being secured between a gas generator case and a combustion chamber liner of the combustor, the access conduit having an open outer end accessible from an outer face of said gas generator case and an open inner end exiting in a combustion chamber through the combustion chamber liner, the access conduit having one or more openings disposed in a gap between the gas generator case and the combustion chamber liner of the combustor, and removable obstruction apparatus securable in the open outer end and extending into the access conduit to obstruct said one or more openings.

2. An access conduit as claimed in claim 1 wherein said removable obstruction apparatus comprises a plug having a stem extending in close sliding fit into said access conduit to obstruct said one or more openings.

3. An access conduit as claimed in claim 2 wherein said access conduit has a straight section extending from said open outer end to said combustion chamber liner, said plug being provided with an engagement element configured for removable securement in said access conduit.

4. An access conduit as claimed in claim 3 wherein said engagement element comprises an outer thread section of said plug for threading engagement with an inner thread section of said access conduit.

5. An access conduit as claimed in claim 3 wherein said engagement element comprises a lock pin removably secured to said plug and to a connecting element of said access conduit exteriorly of said gas generator case.

6. An access conduit as claimed in claim 1 wherein said one or more openings are of predetermined dimension so that in the event said obstruction apparatus is absent during engine operation, sufficient air will be caused to flow into the combustion chamber from said gap through said openings of said access conduit to prevent a torching flame exiting said combustion chamber.

7. An access conduit as claimed in claim 1 wherein said access conduit is a hollow combustor support pin, said support pin being secured to said combustion chamber liner adjacent said open inner end and to said gas generator case adjacent said open outer end.

8. An access conduit as claimed in claim 7 wherein said combustor support pin is a straight hollow metal pin, said removable obstruction apparatus being a metal plug having a stem dimensioned to extend in close sliding fit into said hollow combustor support pin, said combustor support pin being disposed in an ignitor plane of said combustor.

9. An access conduit as claimed in claim 8 wherein said metal plug has an engaging portion for removable engagement with said hollow metal pin.

10. An access conduit as claimed in claim 9 wherein said engaging portion is an outer thread section of said plug for threading engagement with an inner thread of said access conduit.

11. An access conduit as claimed in claim 9 wherein said engaging portion comprises a lock pin removably secured to said plug and to a connecting element of said access conduit exteriorly of said gas generator case.

12. A method of providing access to an interior of a combustor for washing of turbine components of a gas turbine, said method comprising:
   i) providing an access conduit between a gas generator case and a combustion chamber liner of a combustor with an open outer end of said access conduit being accessible exteriorly of said gas generator case and an open inner end exiting in a combustion chamber of said combustor through said liner, said access conduit having one or more openings disposed in a combustor gap between said gas generator case and said liner,
   ii) securing a removable obstruction means in said open top end of said access conduit and extending into said access conduit to obstruct said one or more openings, iii) providing access through said access conduit inside said combustion chamber by the removal of said obstruction means to provide for the insertion of a wash delivery conduit element in said access conduit and inside said combustion chamber to wash said turbine components.

13. A method as claimed in claim 12 wherein said step (i) comprises utilizing one of two or more hollow support pins of said combustor as said access conduits.

14. A method as claimed in claim 13 wherein there is further provided the step of boring a side wall section of said one of said support pins to form said one or more openings, said openings being of predetermined dimension so that in the event said obstruction means is absent from said one of said support pins during engine operation, sufficient air will be caused to flow into the combustion chamber from said combustor gap through said openings to prevent a torching flame exiting said combustion chamber through said one of said support pins.

* * * * *